US012634216B2

(12) United States Patent
Uscumlic et al.

(10) Patent No.: US 12,634,216 B2
(45) Date of Patent: May 19, 2026

(54) HYBRID P4-BASED DETERMINISTIC SWITCH

(71) Applicant: Nokia Solutions and Networks Oy, Espoo (FI)

(72) Inventors: Bogdan Uscumlic, Orsay (FR); Abdelmajid Moussaoui, Palaiseau (FR)

(73) Assignee: Nokia Solutions and Networks Oy, Espoo (FI)

( * ) Notice: Subject to any disclaimer, the term of this patent is extended or adjusted under 35 U.S.C. 154(b) by 219 days.

(21) Appl. No.: 18/474,164

(22) Filed: Sep. 25, 2023

(65) Prior Publication Data

US 2025/0106137 A1 Mar. 27, 2025

(51) Int. Cl.
H04L 43/087 (2022.01)
H04L 43/16 (2022.01)

(52) U.S. Cl.
CPC ............ H04L 43/087 (2013.01); H04L 43/16 (2013.01)

(58) Field of Classification Search
CPC ..... H04L 43/087; H04L 43/16; H04L 47/283; H04L 49/206; H04L 49/355; H04L 49/604; H04L 49/65; H04L 47/56
See application file for complete search history.

(56) References Cited

U.S. PATENT DOCUMENTS

2018/0310078 A1* 10/2018 Szymanski ........... H04L 47/621
2021/0243172 A1 8/2021 Szymanski 2021/0288910 A1 9/2021 Daly et al.
2023/0275852 A1* 8/2023 Benzaoui .............. H04J 3/0661
370/355

(Continued)

OTHER PUBLICATIONS

P4 Open Source Programming Language, Language Consortium, Linux Foundation; printed in 2024, pp. (4). https://p4.org/working-groups/.

(Continued)

*Primary Examiner* — Soe Hlaing
(74) *Attorney, Agent, or Firm* — Tong, Rea, Bentley & Kim, LLC

(57) ABSTRACT

Various example embodiments for supporting deterministic communications in communication networks may be based on use of a hybrid Programming Protocol-Independent Packet Processor (P4) deterministic switch. The hybrid P4 deterministic switch may include an electronic communication element configured to compensate for the jitter of incoming traffic to match a desired level of jitter for end-to-end deterministic communication of the incoming traffic and an optical communication element configured to support optical propagation of deterministic traffic received from the electronic communication element. The electronic communication element may include electronic packet queues, programmable electronic schedulers serving the electronic packet queues, and a P4 control element, where the electronic packet queues, the programmable electronic schedulers, and the P4 control element cooperate to support end-to-end deterministic communication of traffic based on control plane programming of the programmable electronic schedulers to serve the electronic packet queues in a manner providing end-to-end deterministic communication of the traffic.

20 Claims, 6 Drawing Sheets

(56)          References Cited

U.S. PATENT DOCUMENTS

| | | | | |
|---|---|---|---|---|
| 2023/0336487 | A1* | 10/2023 | Wang | H04L 47/2441 |
| 2025/0039103 | A1* | 1/2025 | Guo | H04L 47/283 |

OTHER PUBLICATIONS

Alexander S. Gillis, "Spine-Leaf (spine-leaf architecture)", Data Center design and facilities, Tech Target; last updated on Aug. 2022; pp. (2).

Time-Sensitive Networking (TSN) Task Group, Powered by IEEE 802.1, RSS; printed on Apr. 15, 2024, pp. (8). https://1.ieee802.org/tsn/.

Time Sensitive Networking IP-Cores, Fraunhofer Institute for Photonic Microsystems; printed on Apr. 15, 2024, pp. (3). https://www.ipms. fraunhofer.de/en/Components-and-Systems/Components-and-Systems-Data-Communication/ip-cores/IP-Core-Modules/time-sensitive-networking.html.

Y. Seol, D. Hyeon, J. Min, M. Kim, and J. Paek, "Timely Survey of Time-Sensitive Networking: Past and Future Directions", Department of Computer Science and Engineering, Chung-Ang University, Seoul, South Korea; IEEE Access; Oct. 15, 2021, pp. (22).

X. Xue, N. Calabretta, "Nanosecond optical switching and control system for data center networks," Nat Commun 13, 2257; 2022, pp. (8). https://doi.org/10.1038/s41467-022-29913-1.

William M. Mellette, "A Practical Approach to Optical Switching in Data Centers," 2019 Optical Fiber Communications Conference and Exhibition (OFC), San Diego, CA, USA; 2019, pp. (3).

C. Bookham, A. Stone, J. Tantsura, M. Durrani, B. Decraene, "An Architecture for Network Function Interconnect", RTG Working Group, Equinix Inc. Orange, IETF Trust; published Aug. 12, 2023, pp. (45).

Extended European Search Report, Application No. 24196345.3-1215, dated Jan. 22, 2025, 15 pages.

\* cited by examiner

HYBRID P4-BASED DETERMINISTIC SWITCH

TECHNICAL FIELD

Various example embodiments relate generally to communication systems and, more particularly but not exclusively, to supporting communications within communication networks.

BACKGROUND

Various communications technologies may be used to support communications in various types of communication systems.

SUMMARY

In at least some example embodiments, an apparatus includes an optical communication element and an electronic communication element. The optical communication element is configured to support propagation of traffic using optical signals. The electronic communication element includes a set of electronic packet queues configured to queue electronic packets, a set of programmable electronic schedulers configured to serve the electronic packet queues for controlling propagation of the electronic packets from the electronic packet queues toward the optical communication element, and a controller configured to determine a traffic transmission schedule configured to compensate for jitter of the electronic packets queued in the electronic packet queues and configured to perform control plane programming of the programmable electronic schedulers to serve the electronic packet queues according to the traffic transmission schedule. In at least some example embodiments, the traffic transmission schedule is configured to compensate for the jitter of the electronic packets to satisfy a jitter threshold. In at least some example embodiments, a first electronic packet queue from the set of electronic packet queues is configured to queue a first set of electronic packets, and the electronic packets in the first set of electronic packets are non-deterministic when arriving to the first electronic packet queue and deterministic when leaving the first electronic packet queue based on serving of the first electronic packet queue based on the traffic transmission schedule. In at least some example embodiments, a first electronic packet queue from the set of electronic packet queues, which is associated with a first programmable electronic scheduler from the set of programmable electronic schedulers, is configured to queue a first set of electronic packets of a non-deterministic flow, and the first programmable electronic scheduler is configured to serve the first electronic packet queue based on the traffic transmission schedule such that the non-deterministic flow becomes a deterministic flow when exiting the first electronic packet queue. In at least some example embodiments, the traffic transmission schedule is determined based on routing information indicative of routing paths for the electronic packets. In at least some example embodiments, the routing information is obtained from a forwarding information base. In at least some example embodiments, the traffic transmission schedule is determined based on a jitter threshold indicative of a predefined level of jitter permissible for end-to-end deterministic communication. In at least some example embodiments, the control plane programming is based on a Programming Protocol-Independent Packet Processor (P4) programming language. In at least some example embodiments, the electronic communication element is configured to propagate the electronic packets from the electronic packet queues toward the optical communication element for transport via an optical fiber. In at least some example embodiments, the optical communication element includes an add/drop section and a transit section, wherein the transit section includes an optical fiber interconnection matrix, wherein the electronic communication element is configured to propagate the electronic packets from the electronic packet queues toward an add section of the add/drop section, wherein the add section of the add/drop section is configured propagate optical signals representing the electronic packets toward the optical fiber interconnection matrix of the transit section.

In at least some example embodiments, an apparatus includes at least one processor and at least one memory including instructions which, when executed by the at least one processor, cause the apparatus at least to control queuing of electronic packets using a set of electronic packet queues associated with a set of programmable electronic schedulers, determine a traffic transmission schedule configured to compensate for jitter of the electronic packets queued in the electronic packet queues, and perform control plane programming of the programmable electronic schedulers to serve the electronic packet queues according to the traffic transmission schedule. In at least some example embodiments, the traffic transmission schedule is configured to compensate for the jitter of the electronic packets to satisfy a jitter threshold. In at least some example embodiments, a first set of electronic packets is queued in a first electronic packet queue from the set of electronic packet queues, and the electronic packets in the first set of electronic packets are non-deterministic when arriving to the first electronic packet queue and deterministic when leaving the first electronic packet queue based on serving of the first electronic packet queue based on the traffic transmission schedule. In at least some example embodiments, a first set of electronic packets is queued in a first electronic packet queue from the set of electronic packet queues, and the first electronic packet queue is served by a first programmable electronic scheduler from the set of programmable electronic schedulers, based on the traffic transmission schedule, such that the non-deterministic flow becomes a deterministic flow when exiting the first electronic packet queue. In at least some example embodiments, the traffic transmission schedule is determined based on routing information indicative of routing paths for the electronic packets. In at least some example embodiments, the routing information is obtained from a forwarding information base. In at least some example embodiments, the traffic transmission schedule is determined based on a jitter threshold indicative of a predefined level of jitter permissible for end-to-end deterministic communication. In at least some example embodiments, the control plane programming is based on a Programming Protocol-Independent Packet Processor (P4) programming language. In at least some example embodiments, the at least one memory includes instructions which, when executed by the at least one processor, cause the apparatus at least to control propagation of the electronic packets from the electronic packet queues toward an optical communication element for transport via an optical fiber.

In at least some example embodiments, a non-transitory computer-readable medium stores computer program instructions which, when executed by an apparatus, cause the apparatus at least to control queuing of electronic packets using a set of electronic packet queues associated with a set of programmable electronic schedulers, determine a traffic transmission schedule configured to compensate for jitter of the electronic packets queued in the electronic packet queues, and perform control plane programming of the programmable electronic schedulers to serve the electronic packet queues according to the traffic transmission schedule. In at least some example embodiments, the traffic transmission schedule is configured to compensate for the jitter of the electronic packets to satisfy a jitter threshold. In at least some example embodiments, a first set of electronic packets is queued in a first electronic packet queue from the set of electronic packet queues, and the electronic packets in the first set of electronic packets are non-deterministic when arriving to the first electronic packet queue and deterministic when leaving the first electronic packet queue based on serving of the first electronic packet queue based on the traffic transmission schedule. In at least some example embodiments, a first set of electronic packets is queued in a first electronic packet queue from the set of electronic packet queues, and the first electronic packet queue is served by a first programmable electronic scheduler from the set of programmable electronic schedulers, based on the traffic transmission schedule, such that the non-deterministic flow becomes a deterministic flow when exiting the first electronic packet queue. In at least some example embodiments, the traffic transmission schedule is determined based on routing information indicative of routing paths for the electronic packets. In at least some example embodiments, the routing information is obtained from a forwarding information base. In at least some example embodiments, the traffic transmission schedule is determined based on a jitter threshold indicative of a predefined level of jitter permissible for end-to-end deterministic communication. In at least some example embodiments, the control plane programming is based on a Programming Protocol-Independent Packet Processor (P4) programming language. In at least some example embodiments, the computer program instructions, when executed by the apparatus, cause the apparatus at least to control propagation of the electronic packets from the electronic packet queues toward an optical communication element for transport via an optical fiber.

In at least some example embodiments, a method includes controlling queuing of electronic packets using a set of electronic packet queues associated with a set of programmable electronic schedulers, determining a traffic transmission schedule configured to compensate for jitter of the electronic packets queued in the electronic packet queues, and performing control plane programming of the programmable electronic schedulers to serve the electronic packet queues according to the traffic transmission schedule. In at least some example embodiments, the traffic transmission schedule is configured to compensate for the jitter of the electronic packets to satisfy a jitter threshold. In at least some example embodiments, a first set of electronic packets is queued in a first electronic packet queue from the set of electronic packet queues, and the electronic packets in the first set of electronic packets are non-deterministic when arriving to the first electronic packet queue and deterministic when leaving the first electronic packet queue based on serving of the first electronic packet queue based on the traffic transmission schedule. In at least some example embodiments, a first set of electronic packets is queued in a first electronic packet queue from the set of electronic packet queues, and the first electronic packet queue is served by a first programmable electronic scheduler from the set of programmable electronic schedulers, based on the traffic transmission schedule, such that the non-deterministic flow becomes a deterministic flow when exiting the first electronic packet queue. In at least some example embodiments, the traffic transmission schedule is determined based on routing information indicative of routing paths for the electronic packets. In at least some example embodiments, the routing information is obtained from a forwarding information base. In at least some example embodiments, the traffic transmission schedule is determined based on a jitter threshold indicative of a predefined level of jitter permissible for end-to-end deterministic communication. In at least some example embodiments, the control plane programming is based on a Programming Protocol-Independent Packet Processor (P4) programming language. In at least some example embodiments, the method includes controlling propagation of the electronic packets from the electronic packet queues toward an optical communication element for transport via an optical fiber.

In at least some example embodiments, an apparatus includes means for controlling queuing of electronic packets using a set of electronic packet queues associated with a set of programmable electronic schedulers, determining a traffic transmission schedule configured to compensate for jitter of the electronic packets queued in the electronic packet queues, and performing control plane programming of the programmable electronic schedulers to serve the electronic packet queues according to the traffic transmission schedule. In at least some example embodiments, the traffic transmission schedule is configured to compensate for the jitter of the electronic packets to satisfy a jitter threshold. In at least some example embodiments, a first set of electronic packets is queued in a first electronic packet queue from the set of electronic packet queues, and the electronic packets in the first set of electronic packets are non-deterministic when arriving to the first electronic packet queue and deterministic when leaving the first electronic packet queue based on serving of the first electronic packet queue based on the traffic transmission schedule. In at least some example embodiments, a first set of electronic packets is queued in a first electronic packet queue from the set of electronic packet queues, and the first electronic packet queue is served by a first programmable electronic scheduler from the set of programmable electronic schedulers, based on the traffic transmission schedule, such that the non-deterministic flow becomes a deterministic flow when exiting the first electronic packet queue. In at least some example embodiments, the traffic transmission schedule is determined based on routing information indicative of routing paths for the electronic packets. In at least some example embodiments, the routing information is obtained from a forwarding information base. In at least some example embodiments, the traffic transmission schedule is determined based on a jitter threshold indicative of a predefined level of jitter permissible for end-to-end deterministic communication. In at least some example embodiments, the control plane programming is based on a Programming Protocol-Independent Packet Processor (P4) programming language. In at least some example embodiments, the apparatus includes means for controlling propagation of the electronic packets from the electronic packet queues toward an optical communication element for transport via an optical fiber.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Figure 1:
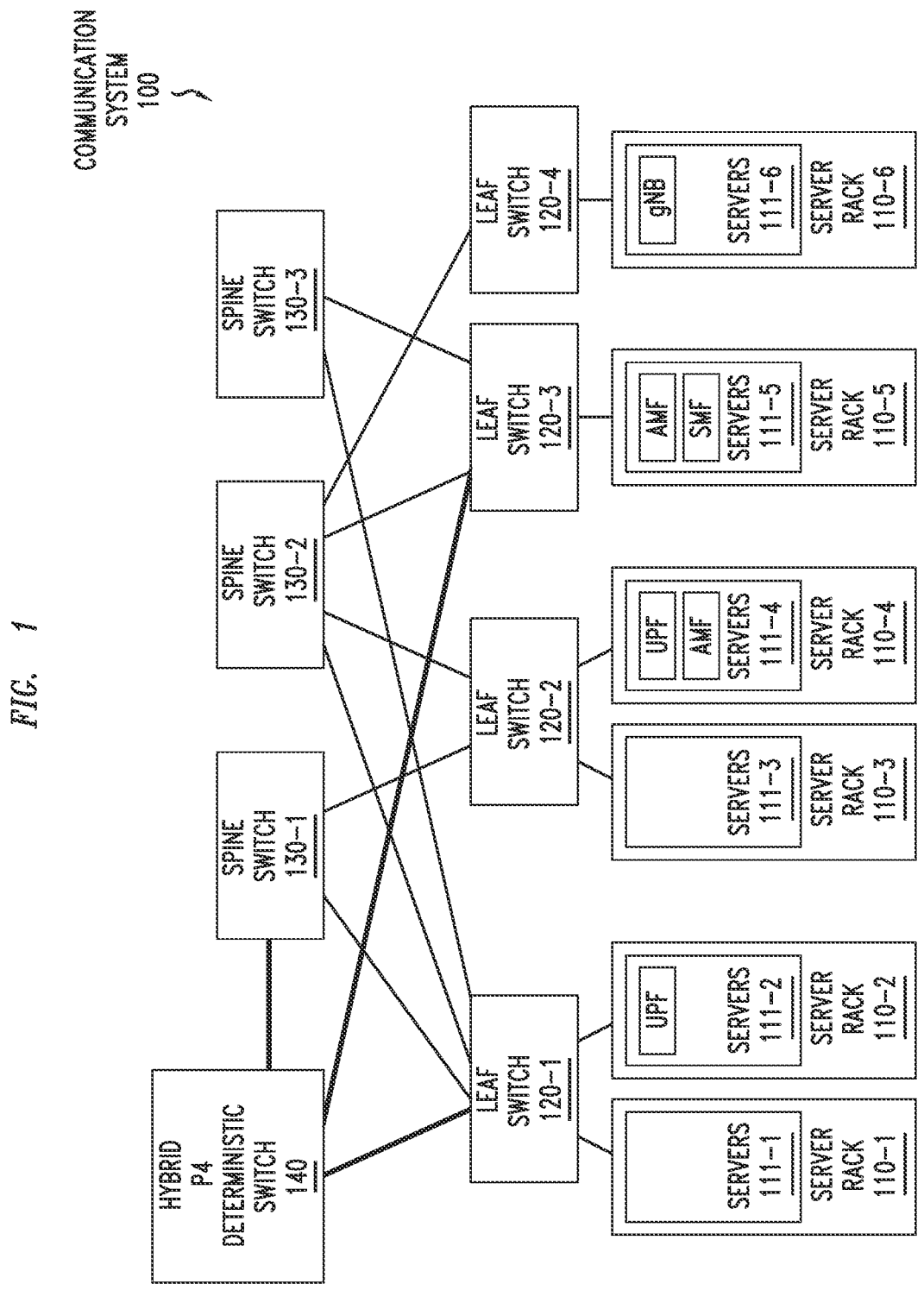
FIG. 1 depicts an example embodiment of a communication system including a set of communication endpoints and a hybrid Programming Protocol-Independent Packet Processor (P4) deterministic switch configured to support deterministic communications between the communication endpoints.

Various example embodiments for supporting deterministic communications in communication networks are presented herein. Various example embodiments for supporting deterministic communication in communication networks may be configured to support end-to-end deterministic communication between communication endpoints in a communication network. Various example embodiments for supporting end-to-end deterministic communication between communication endpoints in a communication network may be configured to support end-to-end deterministic communication between communication endpoints in an Internet Protocol (IP) based network. Various example embodiments for supporting end-to-end deterministic communication between communication endpoints in an IP-based network may be configured to support end-to-end deterministic communication between various types of communication endpoints, such as devices (e.g., end devices, network devices, or the like), functions (e.g., network functions, service functions, or the like), machines (e.g., physical machines, virtual machines, or the like), applications, or the like, as well as various combinations thereof. Various example embodiments for supporting end-to-end deterministic communication between communication endpoints in an IP-based network may be configured to support end-to-end deterministic communication between various types of communication endpoints which may operate within various types of IP-based communication networks, such as access networks, core networks, cloud networks, data center networks, enterprise networks, or the like, as well as various combinations thereof. It will be appreciated that various example embodiments for supporting deterministic communication in communication networks may be configured to support end-to-end deterministic communication between communication endpoints in various other contexts.

Various example embodiments for supporting deterministic communications in communication networks may be configured to support deterministic communications in communication networks based on use of a Programming Protocol-Independent Packet Processor (P4) switch that is configured to support deterministic communication between communication endpoints. P4 is a data-plane programming language for network devices that enables data plane programming of the network devices during the lifetime of the network devices, unlike network devices that are based on Application Specific Integrated Circuits (ASICs) (which, though quite performant, are inflexible since their data-plane functionality is hard-coded in hardware and usually does not change during the lifetime of the network devices). P4 also, in addition to being flexible in terms of data plane programming, is target-independent (e.g., it can be applied to central processing units (CPUs), field-programmable gate arrays (FPGAs), system-on-chips (SOCs), and so forth) and protocol-independent (e.g., it supports various existing data-plane protocols and can be used to develop new protocols). Various example embodiments for supporting deterministic communications in communication networks may be configured to support deterministic communications in communication networks based on use of a P4 switch including a set of electronic packet queues, a set of programmable electronic schedulers serving the electronic packet queues, and a P4 control element, where the electronic packet queues, the programmable electronic schedulers, and the P4 control element cooperate to support end-to-end deterministic communication of traffic.

Various example embodiments for supporting deterministic communications in communication networks may be configured to support deterministic communications in communication networks based on use of a hybrid P4 deterministic switch. The hybrid P4 deterministic switch may include an electronic communication element configured to compensate for the jitter of incoming traffic to match a desired level of jitter for end-to-end deterministic communication of the incoming traffic and an optical communication element configured to support optical propagation of deterministic traffic received from the electronic communication element. The electronic communication element may include a set of electronic packet queues, a set of programmable electronic schedulers serving the electronic packet queues, and a P4 control element. The electronic packet queues are configured to queue electronic packets. The electronic schedulers are configured to serve the electronic packet queues for controlling propagation of the electronic packets from the electronic packet queues toward the optical communication element. The P4 control element is configured to determine a traffic transmission schedule configured to compensate for jitter of the electronic packets queued in the electronic packet queues and to perform control plane programming of the electronic schedulers to serve the electronic packet queues according to the traffic transmission schedule. In this manner, the electronic communication element and the optical communication element cooperate to support end-to-end deterministic communication of traffic in various contexts.

Various example embodiments for supporting deterministic communications in communication networks may be configured to support deterministic communications between network functions (NFs) of a communication service provider. The support for deterministic communication between NFs imposes very strict requirements on the latency and jitter of the communications between the NFs. For example, the latency of arrival between subsequent packets exchanged between NFs may need to be fixed, within minimum jitter which approaches zero (e.g., within a few periods of clock time of the supporting hardware). The NFs may be implemented as cloud-native micro-services in a cloud data center network, which are very efficient in terms of scalability of the use of cloud computing and storage infrastructure, but which pose the additional challenge of how to support the deterministic communication between different NFs due to "function/sidecar" separation of the networking and functional parts of NF implementation. Various example embodiments for supporting deterministic communications in communication networks may be configured to support cost-efficient end-to-end deterministic communications between NFs in an edge cloud data center with a spine-leaf architecture in a manner that supports synchronization in frequency and phase of all the switches participating in deterministic traffic switching and scalability of deterministic switching capacities (since the NFs are "microservices" and can be flexibly deployed on different physical and virtual machines and containers across the edge cloud data center).

It will be appreciated that, although primarily presented herein within the context of providing deterministic communications between particular types of communication endpoints deployed in a particular type communication network (e.g., between network functions (NFs) of a communication service provider that are deployed in an edge cloud of the communication service provider that uses a spine-leaf architecture based on IP-transport), various example embodiments presented herein may be utilized to provide deterministic communications between various other types of communication endpoints which may be associated with communication networks (e.g., client devices, host devices, virtual machines, virtual containers, application endpoints, or the like, as well as various combinations thereof), may be utilized to provide deterministic communications between communication endpoints in various other types of communication networks (e.g., access networks, core networks, enterprise networks, or the like, as well as various combinations thereof), or the like, as well as various combinations thereof).

It will be appreciated that these and various other example embodiments for supporting deterministic communications in communication networks, and advantages or potential advantages of example embodiments for supporting deterministic communications in communication networks, may be further understood by considering various aspects of such example embodiments within the context of an example communication system as depicted in FIG. 1.

FIG. 1 depicts an example embodiment of a communication system including a set of communication endpoints and a hybrid Programming Protocol-Independent Packet Processor (P4) deterministic switch configured to support deterministic communications between the communication endpoints.

The communication system 100 is an edge cloud that is utilizing a spine-leaf transport architecture based on IP-based transport and based on Ethernet-based access. The spine-leaf architecture provides various advantages for supporting communications within the edge cloud, such as by enabling use of same-sized switches for the spine switches and the leaf switches, supporting efficient IP-based load balancing between the spine switches and the leaf switches, and so forth. The communication system 100 includes a set of server racks 110-1 to 110-6 (collectively, server racks 110), a set of leaf switches 120-1 to 120-4 (collectively, leaf switches 120), a set of spine switches 130-1 to 130-3 (collectively, spine switches 130), and a hybrid P4 deterministic switch 140. It will be appreciated that, although the communication system 100 is primarily presented as being implemented using specific types, numbers, and arrangements of elements, in at least some example embodiments the communication system 100 may be implemented using various other types, numbers, and/or arrangements of elements.

The server racks 110-1 to 110-6 include sets of servers 111-1 to 111-6 (collectively, servers 111), respectively. It will be appreciated that each of the server racks 110 may support one or more servers 111, that the numbers of servers 111 supported by the server racks 110 may vary across the server racks, or the like, as well as various combinations thereof. For example, a given server rack 110 may include two servers, four servers, ten servers, forty servers, or the like. The servers 111 may include various resource configured to support applications which may be run on the servers 111 (e.g., NFs as discussed further below, or various other types of applications which may be run on the servers 111), such as processing resources, memory resources, storage resources, input-output resources, and so forth. The servers 111 may support various virtualization capabilities and provide various virtual resources (e.g., virtual machines (VMs), virtual containers (VCs), or the like) which may be utilized to support applications being run on the servers 111. It will be appreciated that the servers 111 of the server racks 110 may be implemented in various other ways.

The servers 111 of the server racks 110 are supporting a set of NFs, which are being implemented as cloud-native services typically referred to as microservices. In the example of FIG. 1, the NFs are functions of a Fifth Generation (5G) core network. More specifically, the set of 5G core NFs includes a pair of User Packet Functions (UPF) deployed on respective servers 111-2 and 111-4 of the server racks 110-2 and 110-4, a pair of Access and Mobility Management Functions (AMFs) deployed on respective servers 111-4 and 111-5 of the server racks 110-4 and 110-5, a Session Management Function (SMF) deployed on a server 111-5 of the server rack 110-5, and a Next-Generation Node B (gNB) deployed on a server 111-6 of the server rack 110-6. It will be appreciated that, although the edge cloud is depicted as including specific types and numbers of NFs for supporting the 5G core network, the edge cloud may include various other types and/or numbers of NFs for supporting the 5G core network. As discussed further below, in order to operate the 5G core network using the NFs, at least some of the NFs need to be interconnected deterministically (and it will be appreciated that, although a limited number of NFs are illustrated, the number of NFs that need to be deterministically interconnected in a cloud network may be quite large and may vary significantly over time, both of which present challenges to supporting deterministic communications between the NFs in the cloud network).

The server racks 110 are connected to the leaf switches 120, thereby providing connectivity to the servers 111 of the server racks 110 for supporting communications of the servers 111 of the server racks 110. More specifically, the server racks 110-1 and 110-2 are connected to the leaf switch 120-1, the server rack 110-3 is connected to the leaf switch 120-2, the server racks 110-4 and 110-5 are connected to the leaf switch 120-3, and the server rack 110-6 are connected to the leaf switch 120-4. The communication of traffic between the servers 111 of the server racks 110 and the leaf switches 120 may be based on Ethernet or other suitable communications protocols. It will be appreciated that, although primarily presented with respect to specific connections between the server racks 110 and leaf switches 120, various other combinations of connections between the server racks 110 and the leaf switches 120 may be supported (e.g., using greater connectivity than as depicted in FIG. 1 such as by using full mesh connectivity from each of the server racks 110 to each of the leaf switches 120 or using less connectivity than as depicted in FIG. 1 such as where each of the server racks 110 is merely dual-homed to two of the leaf switches 120).

The leaf switches 120 are connected to the spine switches 130 to form the spine-leaf architecture. More specifically, the leaf switch 120-1 is connected to each of the spine switches 130, the leaf switch 120-2 is connected to the spine switches 130-1 and 130-2, the leaf switch 120-3 is connected to spine switches 130-2 and 130-3, and the leaf switch 120-4 is connected to the spine switch 130-2. The communication of traffic between the leaf switches 120 and the spine switches 120 may be based on IP or other suitable communications protocols. It will be appreciated that, although primarily presented with respect to specific connections between the leaf switches 120 and the spine switches 130, various other combinations of connections between the leaf switches 120 and the spine switches 130 may be supported (e.g., using greater connectivity than as depicted in FIG. 1 such as by using full mesh connectivity from each of the leaf switches 120 to each of the spine switches 130 or using less connectivity than as depicted in FIG. 1 such as where each of the leaf switches 120 is merely dual-homed to two of the three spine switches 130).

The hybrid P4 deterministic switch 140 is configured to support end-to-end deterministic communications between ones of the NFs deployed on servers 111 of server racks 110 associated with leaf switches 120 to which the hybrid P4 deterministic switch 140 is connected, but not between NFs deployed on servers 111 of server racks 110 associated with leaf switches 120 to which the hybrid P4 deterministic switch 140 is not connected (absent introduction of some additional deterministic networking capabilities). As illustrated, the hybrid P4 deterministic switch 140 is connected to the leaf switch 120-1 (serving server racks 110-1 and 110-2) and the leaf switch 120-3 (serving server rack 110-5) and, thus, may support end-to-end deterministic communications between NFs deployed on the servers 111-1 of the server rack 110-1 and the servers 111-2 of the server rack 110-2 and NFs deployed on the servers 111-5 of the server rack 110-5. For example, hybrid P4 deterministic switch 140 may support end-to-end deterministic communications between the UPF deployed on the servers 111-2 of the server rack 110-2 and the AMF deployed on the servers 111-5 of the server rack 110-5. It will be appreciated that the hybrid P4 deterministic switch 140 may support end-to-end deterministic communications between other pairs of NFs deployed on servers 111 of server racks 110 served by the leaf switches 120-1 and 120-3 to which the hybrid P4 deterministic switch 140 is connected.

The hybrid P4 deterministic switch 140, as indicated above, may be configured to support end-to-end deterministic communications between NFs deployed on servers 111 of server racks 110 associated with leaf switches 120 to which the hybrid P4 deterministic switch 140 is connected. The hybrid P4 deterministic switch 140 may be configured to support end-to-end deterministic communications between NFs in a scalable and reconfigurable way that enables deterministic interconnection of the NFs where the number of NFs that needs to be deterministically interconnected may be quite large and may vary significantly over time, thereby providing cost-efficient support for deterministic interconnection of NFs. The hybrid P4 deterministic switch 140 may be configured to ensure end-to-end deterministic communication between the NFs in a manner that supports synchronization in frequency and phase of switches participating in deterministic traffic switching and that supports scalability of deterministic switching capacities (e.g., since the NFs may be implemented as "microservices" that can be flexibly deployed on different physical and virtual machines and containers across the edge cloud data center).

The hybrid P4 deterministic switch 140 may be configured to support end-to-end deterministic communications between NFs based on use of a programmable deterministic electronic switching matrix. The hybrid P4 deterministic switch 140 may be configured to support end-to-end deterministic communications between NFs based on use of a programmable deterministic electronic switching matrix, coupled with optical circuit switching, in a manner that enables reconfigurable deterministic interconnections. The hybrid P4 deterministic switch 140 may be configured as an opto-electronic switch, including an electronic communication element having electronic packet queues and programmable electronic schedulers and including an optical communication element configured to support propagation of traffic using optical signals over optical fibers, that supports P4-based programmability of the programmable electronic schedulers to schedule propagation of electronic packets from the electronic packet queues to the optical communication element in a manner that enables end-to-end deterministic transport of traffic with deterministically-limited jitter. It will be appreciated that configuration of the hybrid P4 deterministic switch 140 to support end-to-end deterministic communications between endpoints such as NFs may be further understood by way of reference to FIG. 2.

It will be appreciated that, although primarily presented with respect to use of a hybrid P4 deterministic switch to support deterministic communications between specific endpoints within the edge cloud, the hybrid P4 deterministic switch may be connected within the edge cloud in various other ways to support deterministic communications between various other endpoints.

It will be appreciated that, although primarily presented with respect to use of a single hybrid P4 deterministic switch within the edge cloud to support deterministic communications between endpoints, multiple hybrid P4 deterministic switches may be used within the edge cloud to support deterministic communications between endpoints.

It will be appreciated that, although primarily presented with respect to use of the hybrid P4 deterministic switch 140 for supporting end-to-end deterministic communications between specific types of endpoints within a particular type of communication network (namely, between 5G core NFs implemented as microservices running on servers of an edge cloud network), the hybrid P4 deterministic switch 140 may be used for supporting end-to-end deterministic communications between other types of endpoints, between endpoints in other types of networks, or the like, as well as various combinations thereof.

Figure 2:
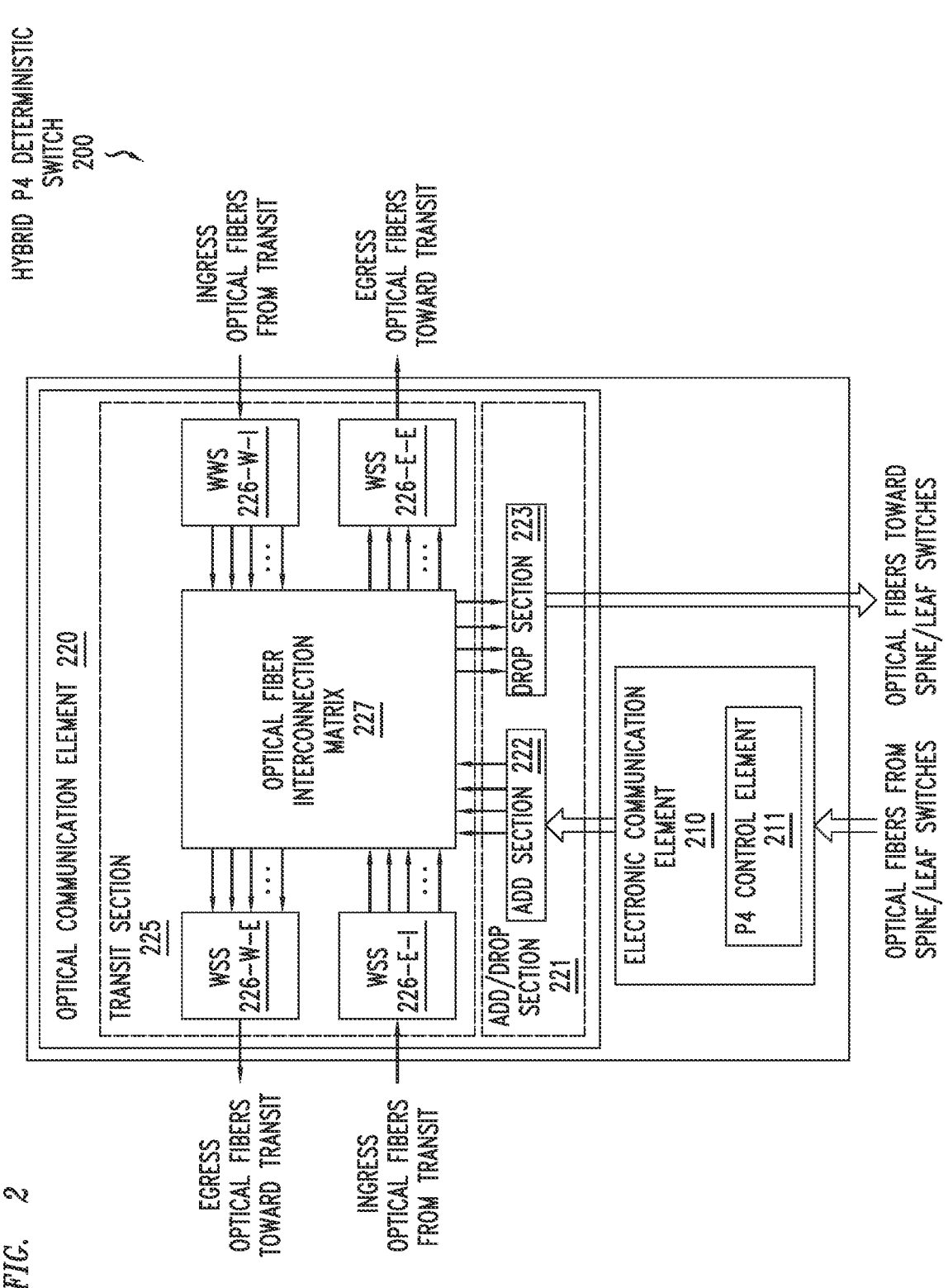
FIG. 2 depicts an example embodiment of a hybrid P4 deterministic switch configured to enable a communication system, such as the communication system of FIG. 1, to support deterministic communications between communication endpoints.

FIG. 2 depicts an example embodiment of a hybrid P4 deterministic switch configured to enable a communication system, such as the communication system of FIG. 1, to support deterministic communications between communication endpoints.

The hybrid P4 deterministic switch 200 may be used as the hybrid P4 deterministic switch 140 of the communication system 100 of FIG. 1, although it will be appreciated that the hybrid P4 deterministic switch 200 also may be deployed in various other contexts (e.g., in other types of cloud networks, in telecommunication service provider networks, or the like). The hybrid P4 deterministic switch 200 is assumed to be connected to one or more non-P4 switches (e.g., one or more leaf and/or spine switches as illustrated in FIG. 1), which are omitted from FIG. 2 for purposes of clarity. The hybrid P4 deterministic switch 200 also may be connected to one or more other hybrid P4 deterministic switches, which also are omitted from FIG. 2 for purposes of clarity. As illustrated in FIG. 2, the hybrid P4 deterministic switch 200 includes an electronic communication element 210 and an optical communication element 220, which may cooperate to support end-to-end deterministic communications.

The electronic communication element 210 is disposed at the local ingress to the hybrid P4 deterministic switch 200. The electronic communication element 210 is configured to receive incoming traffic received at the hybrid P4 deterministic switch 200 from any switches to which the hybrid P4 deterministic switch 200 is connected (e.g., leaf and/or spine switches), to control propagation of the traffic such that traffic becomes deterministic traffic, and to provide the deterministic traffic toward the optical communication element 220 for further propagation from the hybrid P4 deterministic switch 200 (e.g., via transit interfaces toward one or more other hybrid P4 deterministic switches to which the hybrid P4 deterministic switch 200 is connected or via drop interfaces toward one or more leaf and/or spine switches to which the hybrid P4 deterministic switch 200 is connected), thereby supporting deterministic communications between communication endpoints associated with leaf switches to which the hybrid P4 deterministic switch 200 is connected. It is noted that, while the traffic operated on by the electronic communication element 210 may or may not be isochronous when received at the hybrid P4 deterministic switch 200, the traffic operated on by the electronic communication element 210 will be deterministic when leaving the hybrid P4 deterministic switch 200.

The electronic communication element 210 may be configured to support deterministic communication of traffic between communication endpoints associated with leaf switches to which the hybrid P4 deterministic switch 200 is connected based on programming of as set of programmable electronic schedulers to serve a set of electronic packet queues (which queue incoming traffic from the source leaf switches) in a manner that compensates for jitter in the traffic, thereby providing end-to-end deterministic transport of the traffic with deterministically-limited jitter. The electronic communication element 210 may be configured to perform P4-based programming of the programmable electronic schedulers to serve the electronic packet queues in a manner supporting deterministically-limited jitter. The electronic communication element 210 includes a P4 control element 211 configured to perform the P4-based programming of the programmable electronic schedulers to serve the electronic packet queues in a manner a manner supporting deterministically-limited jitter. It will be appreciated that the use of the electronic communication element 210, including the P4 control element 211, to support end-to-end deterministic transport of the traffic with deterministically-limited jitter may be further understood by way of reference to FIG. 3.

The optical communication element 220 is configured to support optical propagation of traffic supported by the hybrid P4 deterministic switch 200. The optical communication element 220 includes various optical communication components which are configured to support optical propagation of traffic. For example, the optical communication element 220 includes electrical-to-optical (E-to-O) conversion elements, optical fibers, optical multiplexers and demultiplexers, wavelength selective switches (WSSs), an optical fiber interconnection matrix, and so forth. The optical communication element 220 includes an add/drop section 221 configured to support optical add/drop functions for local ingress/egress traffic of the hybrid P4 deterministic switch 200 and a transit section 225 configured to support optical transit functions for connectivity to the add/drop section 221 and for transit ingress/egress traffic of the hybrid P4 deterministic switch 200. It will be appreciated that the optical communication element 220 may utilize various other optical communication elements, which may be organized in various other ways, in order to support optical communication of traffic at the hybrid P4 deterministic switch 200.

The add/drop section 221 is configured to support optical add/drop functions for local ingress/egress traffic of the hybrid P4 deterministic switch 200. The add/drop section 221 includes an add section 222 and a drop section 223. The add section 222, which is associated with local ingress to the hybrid P4 deterministic switch 200 from leaf switches to which the hybrid P4 deterministic switch 200 is connected, is disposed between the electronic communication element 210 and the transit section 225 for local ingress to the hybrid P4 deterministic switch 200 for coupling deterministic traffic from the electronic communication element 210 into wavelengths of the optical communication section 220. The add section 222 may include E-to-O conversion elements configured to convert electronic packets into optical signals for optical propagation via the optical communication element 220. The add section 222 may include various optical components, such as optical demultiplexers, WSSs, and so forth. The drop section 223, which is associated with local egress from the hybrid P4 deterministic switch 200 to leaf switches to which the hybrid P4 deterministic switch 200 is connected is disposed between the transit section 225 and local egress optical fibers of the hybrid P4 deterministic switch 200 for local egress from the hybrid P4 deterministic switch 200. The DROP section may include various optical components, such as optical multiplexers, WSSs, and so forth. In this manner, the add/drop section 221 supports optical propagation of traffic for one or more locally-connected leaf switches (i.e., traffic from such leaf switches which is supported by the add section 222 and traffic to such leaf switches which is supported by the drop section 223). It will be appreciated that the add/drop section 221 may utilize various other optical communication elements to support optical communication of traffic at the hybrid P4 deterministic switch 200.

The transit section 225 is configured to support optical switching of traffic at the hybrid P4 deterministic switch 200, including ingress traffic received at the transit section 225 from the add section 222 of the add/drop section 221 (which may include traffic sent to the drop section 223 of the add/drop section 221 and/or transmitted from the transit section 225 via egress optical fibers of the transit section 225) and egress traffic transmitted from the transit section 225 toward the drop section 223 of the add/drop section 221 (which may include traffic received from the add section 222 of the add/drop section 221 and/or received at the transit section 225 via ingress optical fibers of the transit section 225), as well as through-traffic transiting the hybrid P4 deterministic switch 200 via optical fibers connected to the transit section 225. The transit section 225 includes a set of WSSs 226 and an optical fiber interconnection matrix 227 configured to interconnect various optical fibers of the hybrid P4 deterministic switch 200 for supporting add/drop traffic at the hybrid P4 deterministic switch 200 and for supporting through-traffic at the hybrid P4 deterministic switch 200. It will be appreciated that the transit section 225 may utilize various other optical communication elements to support optical communication of traffic at the hybrid P4 deterministic switch 200.

The transit section 225 is configured to support optical switching of traffic at the hybrid P4 deterministic switch 200 based on the optical fiber interconnection matrix 227. For add/drop traffic of the hybrid P4 deterministic switch 200, the optical fiber interconnection matrix 227 is connected to the add/drop section 221 (illustratively, to the add section 222 via a set of input optical fibers for receiving and switching add traffic from the add section 222 and to the drop section 223 via a set of output optical fibers for switching and transmitting drop traffic toward the drop section 223) as well as to sets of ingress/egress optical fibers of the transit section 225 (e.g., for directing add traffic from the add section 222 onto egress transit optical fibers which egress the hybrid P4 deterministic switch 200 on the transit section 225 and for directing drop traffic from ingress transit optical fibers which ingress the hybrid P4 deterministic switch 200 on the transit section 225 to the drop section 223). For through-traffic of the hybrid P4 deterministic switch 200, the transit section 225 uses a pair of WSSs 226 (illustratively, WSS 226-E-I and WSS 226-E-E) and the optical fiber interconnection matrix 227 to support eastbound propagation of transit optical traffic via eastbound optical paths (illustratively, from left to right in the transit section 225 and disposed between a set of ingress optical fibers from transit and a set of egress optical fibers from transit: the WSS 226-E-I connected to the ingress optical fibers, the optical fiber interconnection matrix 227, and the WSS 226-E-E connected to the egress optical fibers) and uses a pair of WSSs 226 (illustratively, WSS 226-W-I and WSS 226-W-E) and the optical fiber interconnection matrix 227 to support westbound propagation of transit optical traffic via westbound optical paths (illustratively, from right to left in the transit section 225 and disposed between a set of ingress optical fibers from transit and a set of egress optical fibers from transit: the WSS 226-W-I connected to the ingress optical fibers, the optical fiber interconnection matrix 227, and the WSS 226-W-E connected to the egress optical fibers). It will be appreciated that the transit section 225 may utilize various other optical communication elements to support optical communication of traffic at the hybrid P4 deterministic switch 200.

It will be appreciated that the hybrid P4 deterministic switch 200, although primarily presented as including specific numbers, types, and arrangements of elements, may include various other numbers, types, and/or arrangements of elements for supporting deterministic communication between communication endpoints associated with the communication system in which the hybrid P4 deterministic switch 200 is deployed.

Figure 3:
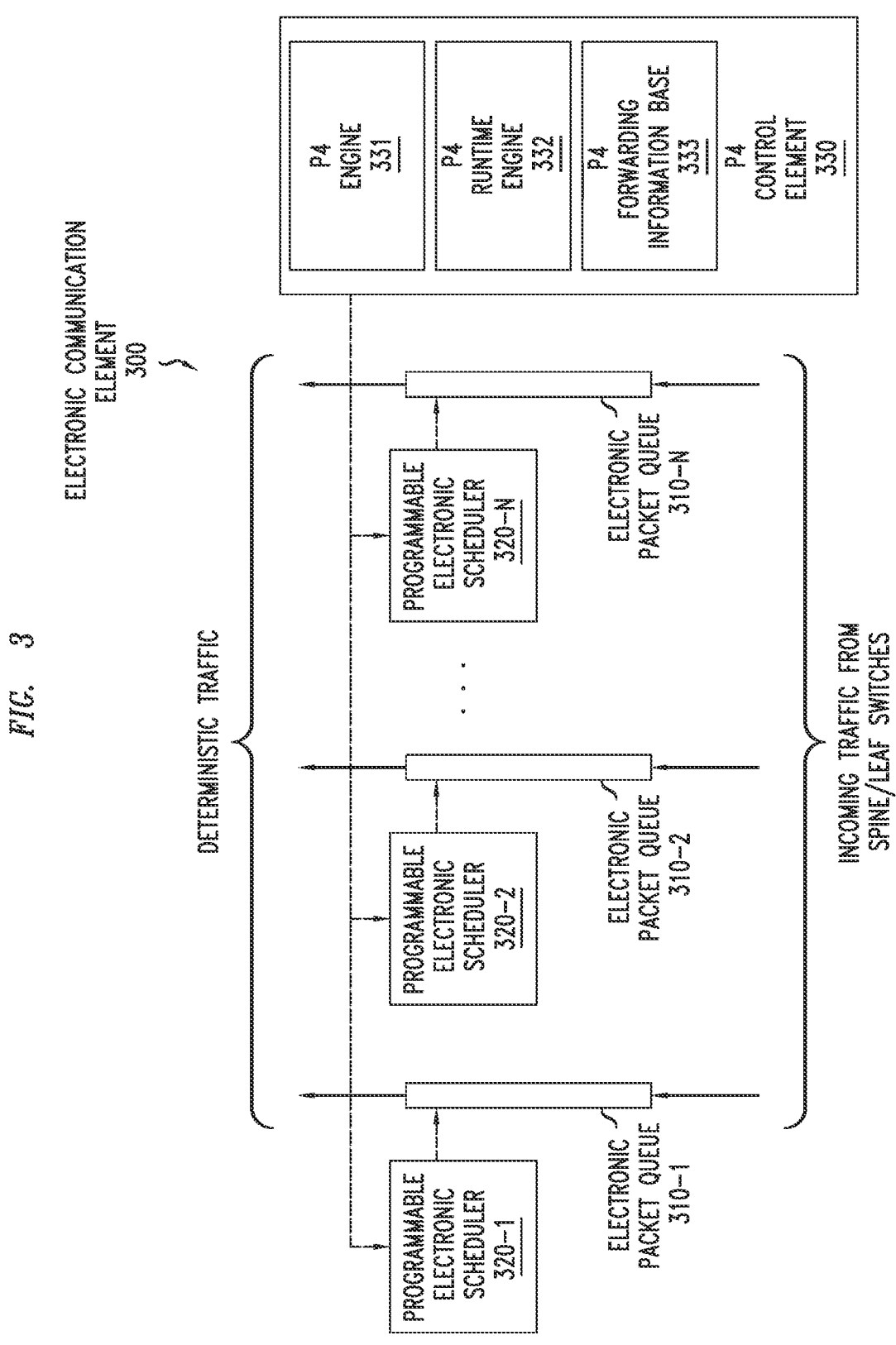
FIG. 3 depicts an example embodiment of a P4 control element configured to enable a hybrid P4 deterministic switch, such as the hybrid P4 deterministic switch of FIG. 2, to support deterministic communications between communication endpoints.

FIG. 3 depicts an example embodiment of an electronic communication element configured to enable a hybrid P4 deterministic switch, such as the hybrid P4 deterministic switch of FIG. 2, to support deterministic communications between communication endpoints.

The electronic communication element 300 may be used as the electronic communication element 210 of the hybrid P4 deterministic switch 200 of FIG. 2, although it will be appreciated that the electronic communication element 300 also may be deployed in various other contexts.

The electronic communication element 300 includes a set of electronic packet queues 310-1 to 310-N (collectively, electronic packet queues 310), a set of programmable electronic schedulers 320-1 to 320-N (collectively, programmable electronic schedulers 320) configured to serve the electronic packet queues 310-1 to 310-N, respectively, and a P4 control element 330.

The electronic packet queues 310 are configured to queue electronic packets for incoming traffic received at the hybrid P4 deterministic switch. The electronic packet queues 310 may be associated with incoming optical interfaces of the hybrid P4 deterministic switch, respectively, and may queue electronic packets for incoming traffic received at the hybrid P4 deterministic switch. For example, the electronic packet queues 310-1 and 310-2 may be associated with 10G optical interfaces of the hybrid P4 deterministic switch, the electronic packet queue 310-3 may be associated with a 50G optical interface of the hybrid P4 deterministic switch, and so forth. It is noted that the traffic received at the electronic packet queues 310 may or may not be isochronous when received at the electronic packet queues 310.

The programmable electronic schedulers 320 are configured to serve the electronic packet queues 310. The programmable electronic schedulers 320 may serve the electronic packet queues 310 by removing the electronic packets from the electronic packet queues 310 and sending the electronic packets to wavelengths of the optical communication element (omitted for purposes of clarity) of the hybrid P4 deterministic switch. The programmable electronic schedulers 320 may serve the electronic packet queues 310 in a manner for compensating for jitter between electronic packets stored in the electronic packet queues 310, where the jitter may be compensated to match a predefined level of jitter for end-to-end deterministic communication (e.g., ensuring that the jitter is fixed at a predefined level that is below a jitter threshold, where the jitter threshold may be based on the capabilities of the underlying hardware, such as within a few periods of clock time of the supporting hardware).

The programmable electronic schedulers 320 may serve the electronic packet queues 310 according to a schedule indicative of the service times at which the programmable electronic schedulers 320 are to serve the electronic packet queues 310. The schedule indicative of the service times at which the programmable electronic schedulers 320 are to serve the electronic packet queues 310 may specify service times at which the programmable electronic schedulers 320 are to serve the electronic packet queues 310, fixed service intervals with which the programmable electronic schedulers 320 are to serve the electronic packet queues 310, or the like, as well as various combinations thereof. It will be appreciated that the schedule indicative of the service times at which the programmable electronic schedulers 320 are to serve the electronic packet queues 310, for compensating jitter of electronic packets queued in the electronic packet queues 310, may be specified in various other ways.

The P4 control element 330 is configured to control operation compensation of the jitter of incoming traffic received at the hybrid P4 deterministic switch. The P4 scheduling controller 330 includes a P4 engine 331, a P4 runtime engine 332, and a P4 forwarding information base (FIB) 333. The P4 engine 331 is configured to support control plane programming of the programmable electronic schedulers 320 to compensate for the jitter of the incoming traffic stored in the electronic packet queues 310. The jitter of the incoming traffic may be compensated to match a desired level of jitter for end-to-end deterministic communication. The P4 runtime engine 332 is configured to provide functions similar to the P4 engine 331, while allowing operation of the P4 control element on a command-line interface (CLI), thereby allowing authorized users to run electronic scheduler configuration/reconfiguration via a CLI. The P4 FIB 333, which may be programmed based on P4, maintains routing information for the incoming traffic received at the electronic packet queues 310, for use by the P4 control element 330 in routing the electronic packets queued in the electronic packet queues 310 and forwarded based on the electronic packet scheduling.

In this manner, the electronic packet queues 310, the programmable electronic schedulers 320 and the P4 control element 330 cooperate to compensate for jitter of incoming traffic received at the hybrid P4 deterministic switch. More specifically, for each pair of electronic packet queue 310 and associated programmable electronic scheduler 320, the electronic packet queue 310 keeps electronic packets queued until the scheduled removal times have arrived and the programmable electronic scheduler 320 is programmed, by the P4 control element 330, to insert traffic from a given switch according to some precise time intervals and, once programmed, serves the associated electronic packet queue 310 regularly (e.g., with fixed serving time) such that the output traffic that is then sent to the wavelengths of hybrid P4 deterministic switch is deterministic in nature. In this manner, the hybrid P4 deterministic switch adapts to any type of insertion traffic and provides end-to-end deterministic transport of the traffic.

Figure 4:
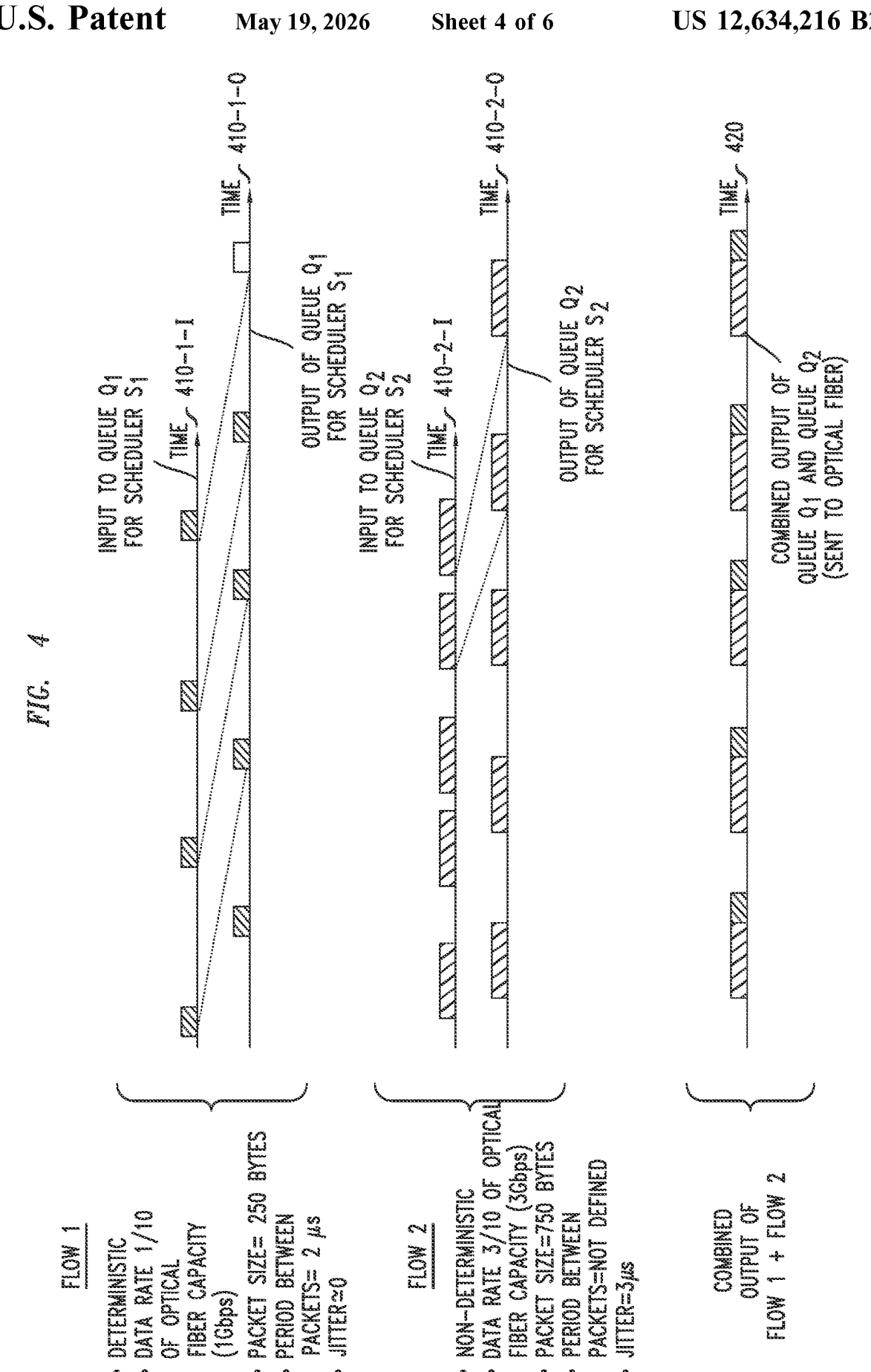
FIG. 4 depicts an example embodiment for use of a hybrid P4 deterministic switch to support deterministic communications between communication endpoints.

FIG. 4 depicts an example embodiment for use of a hybrid P4 deterministic switch to support deterministic communications between communication endpoints.

As depicted in FIG. 4, a hybrid P4 deterministic switch is supporting a deterministic flow (denoted as Flow 1) and a non-deterministic flow (denoted as Flow 2) via an optical fiber that has a capacity of 10 Gbps.

The deterministic flow has a data rate that is $\frac{1}{10}$ of the capacity of the optical fiber (e.g., 1 Gbps), packets having a packet size of 250 bytes, a period between the packets of 2 µs, and a jitter close to 0 (since this flow is already deterministic). The packets of the deterministic flow queued by a first electronic packet queue that is served by a first programmable electronic scheduler denoted as $S_1$. The input timing 410-1-I of the packets at the input to the first electronic packet queue and the output timing 410-1-O of the packets at the output from the first electronic packet queue are depicted. It may be seen that the packets are deterministic when arriving to the first electronic packet queue and deterministic when leaving the first electronic packet queue. The first programmable electronic scheduler $S_1$ serves the first electronic packet queue such that the first flow remains deterministic as the first flow exits the first electronic packet queue.

The non-deterministic flow has a data rate that is $\frac{3}{10}$ of the capacity of the optical fiber (e.g., 3 Gbps), packets having a packet size of 750 bytes, and, since the flow is non-deterministic, a period between the packets that is not defined and a jitter of 3 µs. The packets of the non-deterministic flow are queued by a second electronic packet queue that is served by a second programmable electronic scheduler denoted as $S_2$. The input timing 410-2-I of the packets at the input to the second electronic packet queue and the output timing 410-2-O of the packets at the output from the second electronic packet queue are depicted. It may be seen that the packets are non-deterministic when arriving to the second electronic packet queue and deterministic when leaving the second electronic packet queue. The second programmable electronic scheduler $S_2$ is programmed by a P4 control element to serve the second electronic packet queue such that the second flow becomes deterministic as the second flow exits the second electronic packet queue.

The combined output of the first electronic packet queue and the second electronic packet queue, which is sent to an optical fiber, illustrates that both the first flow and the second flow are now deterministic flows with little to no jitter. This is illustrated by the combined output timing 420.

Figure 5:
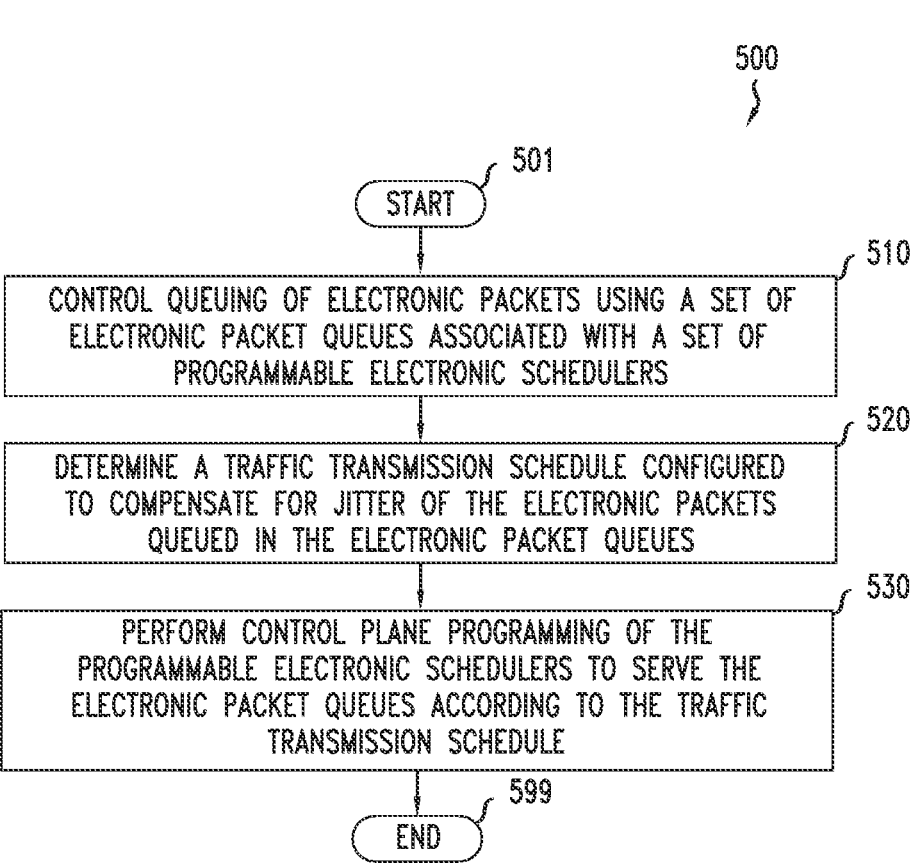
FIG. 5 depicts an example embodiment of a method for use by a hybrid P4 deterministic switch to support deterministic communications between communication endpoints.

FIG. 5 depicts an example embodiment of a method for use by a hybrid P4 deterministic switch to support deterministic communications between communication endpoints. It will be appreciated that, although primarily presented as being performed serially, at least a portion of the functions of the method 500 may be performed contemporaneously or in a different order than as presented with respect to FIG. 5. At block 501, the method 500 begins. At block 510, control queuing of electronic packets using a set of electronic packet queues associated with a set of programmable electronic schedulers. At block 520, determine a traffic transmission schedule configured to compensate for jitter of the electronic packets queued in the electronic packet queues. At block 530, perform control plane programming of the programmable electronic schedulers to serve the electronic packet queues according to the traffic transmission schedule. At block 599, the method 500 ends. It will be appreciated that various functions presented herein with respect to FIGS. 1-4 may be incorporated within the context of the method 500 of FIG. 5.

Various example embodiments for supporting deterministic communications in communication networks may provide various advantages or potential advantages. For example, various example embodiments for supporting deterministic communications in communication networks may be configured to support end-to-end deterministic communications with deterministic latency that ensures deterministically-limited jitter. For example, various example embodiments for supporting deterministic communications in communication networks may be configured to support end-to-end deterministic communications between various types of communication endpoints in various types of communication networks. For example, various example embodiments for supporting deterministic communications in communication networks may be configured to support end-to-end deterministic communications in a cost-optimal and reconfigurable manner. For example, various example embodiments for supporting deterministic communications in communication networks may be configured to support cost-efficient end-to-end deterministic communications between NFs in an edge cloud data center with a spine-leaf architecture. For example, various example embodiments for supporting deterministic communications in communication networks may be configured to support cost-efficient end-to-end deterministic communications between NFs in an edge cloud data center with a spine-leaf architecture without perturbing the functionality or benefits of the spine-leaf architecture (e.g., all non-deterministic traffic remains processed by employing the usual switching and load-balancing features of the spine and leaf switches of the spine-leaf architecture). For example, various example embodiments for supporting deterministic communications in communication networks may be configured to support cost-efficient end-to-end deterministic communications between NFs in an edge cloud data center with a spine-leaf architecture in a manner that supports synchronization in frequency and phase of all the switches participating in deterministic traffic switching and scalability of deterministic switching capacities (since the NFs are "microservices"

and can be flexibly deployed on different physical and virtual machines and containers across the edge cloud data center). For example, various example embodiments for supporting deterministic communications in communication networks may be configured to support deterministic communications between communication endpoints in a communication network using a spine-and-leaf architecture without the need to deploy time-sensitive networking (TSN) switching capabilities at each spine switch and leaf switch of the spine-and-leaf architecture and, thus, without the need to reconfigure each spine switch and leaf switch of the spine-and-leaf architecture when the scheduling process for communications needs to be reconfigured. It will be appreciated that various example embodiments for supporting deterministic communications in communication networks may provide various other advantages or potential advantages.

Figure 6:
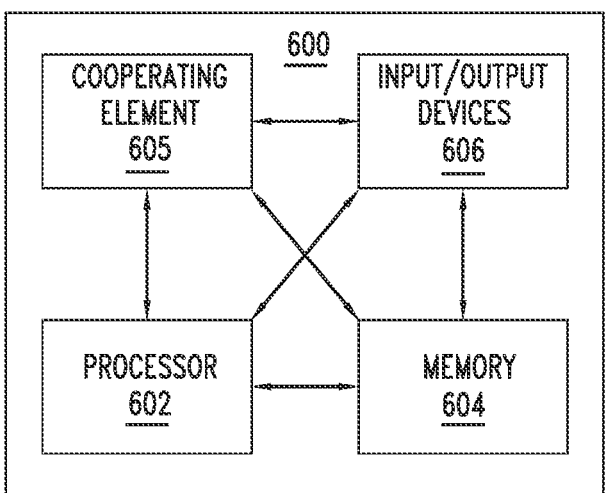
FIG. 6 depicts an example embodiment of a computer suitable for use in performing various functions presented herein.

FIG. 6 depicts an example embodiment of a computer suitable for use in performing various functions presented herein.

The computer 600 includes a processor 602 (e.g., a central processing unit (CPU), a processor, a processor having a set of processor cores, a processor core of a processor, or the like) and a memory 604 (e.g., a random access memory (RAM), a read-only memory (ROM), or the like). In at least some example embodiments, the computer 600 may include at least one processor and at least one memory storing instructions that, when executed by the at least one processor, cause the computer to perform various functions presented herein.

The computer 600 also may include a cooperating element 605. The cooperating element 605 may be a hardware device. The cooperating element 605 may be a process that can be loaded into the memory 604 and executed by the processor 602 to implement various functions presented herein (in which case, for example, the cooperating element 605 (including associated data structures) can be stored on a non-transitory computer readable medium, such as a storage device or other suitable type of storage element (e.g., a magnetic drive, an optical drive, or the like)).

The computer 600 also may include one or more input/output devices 606. The input/output devices 606 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 600 may represent a general architecture and functionality suitable for implementing functional elements described herein, portions of functional elements described herein, or the like, as well as various combinations thereof. For example, the computer 600 may provide a general architecture and functionality that is suitable for implementing one or more elements presented herein. For example, the computer 600 may provide a general architecture and functionality that is suitable for implementing at least one of a server or a portion thereof, a leaf switch or a portion thereof, a spine switch or a portion thereof, a hybrid P4 switch or a portion thereof, an electronic communication element or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. A hybrid deterministic switch, comprising:

an optical communication element configured to support propagation of traffic using optical signals, wherein the optical communication element comprises an optical fiber interconnection matrix configured to interconnect sets of optical fibers of the hybrid deterministic switch for supporting through traffic at the hybrid deterministic switch and add/drop traffic at the hybrid deterministic switch; and an electronic communication element including at least one processor and at least one memory including instructions which, when executed by the at least one processor, cause the electronic communication element at least to:

queue, by a set of electronic packet queues configured to queue electronic packets, a set of electronic packets;

determine, by a controller, a traffic transmission schedule configured to compensate for jitter between the electronic packets stored in the electronic packet queues;

perform, by the controller, control plane programming of a set of programmable electronic schedulers to serve the electronic packet queues according to the traffic transmission schedule; and serve, by the programmable electronic schedulers based on the control plane programming of the programmable electronic schedulers, the electronic packet queues for controlling propagation of the electronic packets from the electronic packet queues toward the optical communication element.

2. The hybrid deterministic switch of claim 1, wherein the traffic transmission schedule is configured to compensate for the jitter between the electronic packets to satisfy a jitter threshold.

3. The hybrid deterministic switch of claim 1, wherein a first electronic packet queue from the set of electronic packet queues queues a first set of electronic packets, wherein the electronic packets in the first set of electronic packets are non-deterministic when arriving to the first electronic packet queue and deterministic when leaving the first electronic packet queue based on serving of the first electronic packet queue based on the traffic transmission schedule.

4. The hybrid deterministic switch of claim 1, wherein a first electronic packet queue from the set of electronic packet queues, which is associated with a first programmable electronic scheduler from the set of programmable electronic schedulers, queues a first set of electronic packets of a non-deterministic flow, wherein the first programmable electronic scheduler serves the first electronic packet queue based on the traffic transmission schedule such that the non-deterministic flow becomes a deterministic flow when exiting the first electronic packet queue.

5. The hybrid deterministic switch of claim 1, wherein the traffic transmission schedule is determined based on routing information indicative of routing paths for the electronic packets.

6. The hybrid deterministic switch of claim 5, wherein the routing information is obtained from a forwarding information base.

7. The hybrid deterministic switch of claim 1, wherein the traffic transmission schedule is determined based on a jitter threshold indicative of a predefined level of jitter permissible for end-to-end deterministic communication.

8. The hybrid deterministic switch of claim 1, wherein the control plane programming is based on a Programming Protocol-Independent Packet Processor (P4) programming language.

9. The hybrid deterministic switch of claim 1, wherein the electronic packets are propagated from the electronic packet queues toward the optical communication element for transport via the set of optical fibers.

10. The hybrid deterministic switch of claim 1, wherein the optical communication element includes an add/drop section and a transit section, wherein the transit section includes the optical fiber interconnection matrix, wherein the electronic packets are propagated from the electronic packet queues toward an add section of the add/drop section, wherein optical signals representing the electronic packets are propagated from the add section of the add/drop section toward the optical fiber interconnection matrix of the transit section.

11. An apparatus, comprising:
at least one processor; and
at least one memory including instructions which, when executed by the at least one processor, cause the apparatus at least to:

control queuing of electronic packets using a set of electronic packet queues associated with a set of programmable electronic schedulers;
determine a traffic transmission schedule configured to compensate for jitter between the electronic packets stored in the electronic packet queues; and
perform control plane programming of the programmable electronic schedulers to serve the electronic packet queues according to the traffic transmission schedule.

12. The apparatus of claim 11, wherein the traffic transmission schedule is configured to compensate for the jitter between the electronic packets to satisfy a jitter threshold.

13. The apparatus of claim 11, wherein a first set of electronic packets is queued in a first electronic packet queue from the set of electronic packet queues, wherein the electronic packets in the first set of electronic packets are non-deterministic when arriving to the first electronic packet queue and deterministic when leaving the first electronic packet queue based on serving of the first electronic packet queue based on the traffic transmission schedule.

14. The apparatus of claim 11, wherein a first set of electronic packets is queued in a first electronic packet queue from the set of electronic packet queues, wherein the first electronic packet queue is served by a first programmable electronic scheduler from the set of programmable electronic schedulers, based on the traffic transmission schedule, such that the non-deterministic flow becomes a deterministic flow when exiting the first electronic packet queue.

15. The apparatus of claim 11, wherein the traffic transmission schedule is determined based on routing information indicative of routing paths for the electronic packets.

16. The apparatus of claim 15, wherein the routing information is obtained from a forwarding information base.

17. The apparatus of claim 11, wherein the traffic transmission schedule is determined based on a jitter threshold indicative of a predefined level of jitter permissible for end-to-end deterministic communication.

18. The apparatus of claim 11, wherein the control plane programming is based on a Programming Protocol-Independent Packet Processor (P4) programming language.

19. The apparatus of claim 11, wherein the at least one memory includes instructions which, when executed by the at least one processor, cause the apparatus at least to:
control propagation of the electronic packets from the electronic packet queues toward an optical communication element for transport via an optical fiber.

20. A method, comprising:
controlling queuing of electronic packets using a set of electronic packet queues associated with a set of programmable electronic schedulers;
determining a traffic transmission schedule configured to compensate for jitter between the electronic packets stored in the electronic packet queues; and
performing control plane programming of the programmable electronic schedulers to serve the electronic packet queues according to the traffic transmission schedule.

* * * * *